United States Patent
Madej et al.

(10) Patent No.: US 7,364,080 B2
(45) Date of Patent: Apr. 29, 2008

(54) SYSTEM AND METHOD FOR BAR CODE DETECTION

(75) Inventors: Dariusz Madej, Shoreham, NY (US); Miroslav Trajkovic, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/387,545

(22) Filed: Mar. 22, 2006

(65) Prior Publication Data

US 2007/0221734 A1    Sep. 27, 2007

(51) Int. Cl.
*G06K 7/10* (2006.01)
(52) U.S. Cl. .................. 235/462.01; 235/462.08; 235/462.16
(58) Field of Classification Search .......... 235/462.01, 235/462.12, 462.13, 462.18, 462.08, 462.19, 235/462.16, 462.07, 462.25
See application file for complete search history.

(56) References Cited

U.S. PATENT DOCUMENTS 4,782,220 A * 11/1988 Shuren ............... 235/462.18
5,821,520 A * 10/1998 Mulla et al. ........... 235/462.27
2004/0164155 A1    8/2004 Iwaguchi et al.
2006/0180669 A1 * 8/2006 Hara .................... 235/462.07

FOREIGN PATENT DOCUMENTS

EP    0 262 924    4/1988

* cited by examiner

*Primary Examiner*—Daniel Stcyr
(74) *Attorney, Agent, or Firm*—Fay Kaplun & Marcin, LLP

(57) ABSTRACT

Described is a system and method for bar code detection. The method comprises generating a digitized bar pattern (DBP) including a series of elements corresponding to elements of a scanned bar code, and identifying a first set of margins around a first portion of the series of elements. When an attempt to decode the first portion is unsuccessful, the first portion is analyzed to determine a second set of margins around a second portion of the series of elements, the second set of margins being within the first set of margins, and the second portion is input to a decoding algorithm.

24 Claims, 4 Drawing Sheets

500

| | | | | | | | | | |
|---|---|---|---|---|---|---|---|---|---|
| | 71 | 152 | 75 | 157 | 72 | 162 | 73 | 168 | 73 |
| 170 | 77 | 175 | 82 | 170 | 182 | 90 | 82 | 187 | 93 |
| 192 | 189 | 105 | 86 | 213 | 204 | 111 | 103 | 225 | 103 |
| 257 | 242 | 127 | 123 | 279 | 129 | 328 | 307 | 182 | |

525

SYSTEM AND METHOD FOR BAR CODE DETECTION

FIELD OF THE INVENTION

The present invention relates generally to systems and methods for detecting bar codes.

BACKGROUND

A traditional laser-based scanner converts laser light reflected off a bar code into a digitized bar pattern (DBP) using a digitizer. A first step in decoding the bar code is to locate a signal corresponding to the bar code within the DBP. This is typically accomplished using a center-out margin search to identify left and right margins of the bar code. Once the margin search has been completed, a decoder assumes that the signal between the left and right margins comprises the bar code and attempts to decode the signal. However, the decoding may fail when noise causes the digitizer to detect additional transitions leading to misidentification of the margins. The decoding may also fail for bar codes printed without quiet space (i.e., white space) around the left and right margins, e.g., reduced space symbology (RSS) bar codes. In addition, omni-dimensional scanning may contribute to the decoding failure. For example, gain control of the signal may be difficult, because successive scans may cross through surfaces of different reflectivity causing a high variance in signal levels. Thus, there is a need for a more accurate method of identifying the bar code within a scanner signal.

SUMMARY OF THE INVENTION

The present invention relates to a system and method for bar code detection. The method comprises generating a digitized bar pattern (DBP) including a series of elements corresponding to elements of a scanned bar code, and identifying a first set of margins around a first portion of the series of elements. When an attempt to decode the first portion is unsuccessful, the first portion is analyzed to determine a second set of margins around a second portion of the series of elements, the second set of margins being within the first set of margins, and the second portion is input to a decoding algorithm.

A system according to the present invention comprises a processor generating a digitized bar pattern (DBP) including a series of elements corresponding to elements of a bar code. The processor identifying a first set of margins around a first portion of the series of elements. When an attempt to decode the first portion by the processor is unsuccessful, the processor analyzes the first portion to determine a second set of margins around a second portion of the series of elements, the second set of margins being within the first set of margins. The processor inputs the second portion to a decoding algorithm.

DETAILED DESCRIPTION

Figure 1:
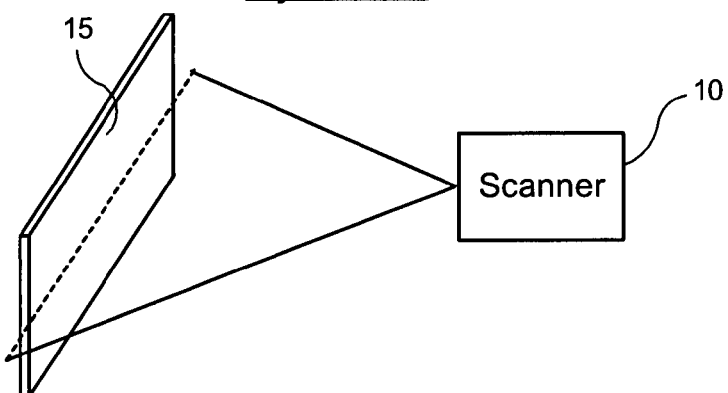
FIG. 1 shows an exemplary embodiment of a system for bar code detection according to the present invention.

The present invention may be further understood with reference to the following description and the appended drawings, wherein like elements are referred to with the same reference numerals. The present invention describes a system and method for bar code detection within a signal generated by scanning the bar code. The exemplary embodiments of the present invention will be described with reference to a one-dimensional laser scanner. However, those of skill in the art will understand that the present invention may also be utilized for two-dimensional and omni-dimensional scanning.

FIG. 1 shows an exemplary system 5 for detecting and decoding a bar code. In the system 5, a bar code scanner 10 (e.g., a laser bar code scanner) collects a reflection of a laser beam off of a bar code 15 to generate an input signal which is converted to a digitized bar pattern (DBP) by a digitizer (e.g., edge detector). That is, the digitizer detects transitions (black-to-white) in the input signal which correspond to elements (i.e., bars and spaces) of the bar code 15. The digitizer may also measure a number of data points between each transition which corresponds to a width of each element in the DBP. As will be explained further below, the widths of the elements may be used to identify a location of a portion of the DBP which corresponds to the bar code 15.

Figure 2:
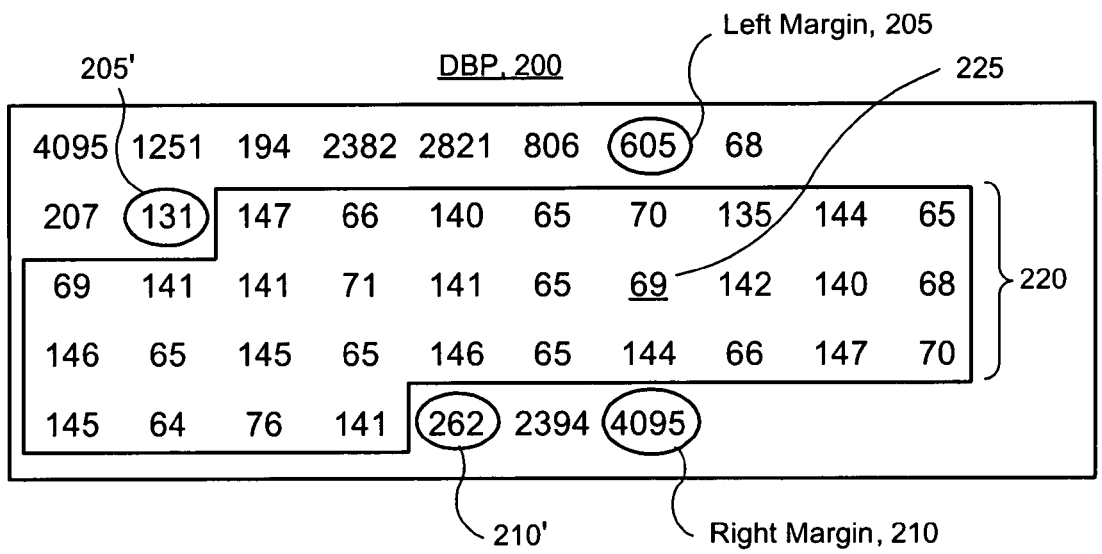
FIG. 2 shows an exemplary embodiment of a digitized bar pattern from a scanned bar code according to the present invention.
Figure 3:
FIG. 3 shows an exemplary embodiment of an MSI Plessey bar code.

FIG. 2 shows an exemplary embodiment of a DBP 200 generated from a scan of the bar code 15. In the exemplary embodiment, the DBP 200 represents a fragment of an MSI Plessey bar code 300, an example of which is shown in FIG. 3. According to the present invention, the fragment(s) of the bar code may be decoded "as is" and/or be used, collectively, as input to a stitching algorithm. As known by those of skill in the art, the MSI Plessey bar code 300 has a predefined length and format. That is, the MSI Plessey bar code 300 utilizes two bar widths, e.g., wide bar=1, narrow bar=0. A "0" bit is a narrow bar followed by a wide space, and a "1" bit is a wide bar followed by a narrow space. Each character is comprised of four bits encoding digits 0-9. A start element is a "1" bit, and a stop element is a "0" bit. Although, the exemplary embodiments of the present invention are described with reference to the MSI Plessey bar code 300, those of skill in the art will understand that the present invention may be implemented for other symbologies, e.g., binary, delta, etc. Additionally, while FIG. 2 shows the fragment of the DBP 200, those of skill in the art will understand that a DBP of an entire bar code may be utilized.

Figure 4A:
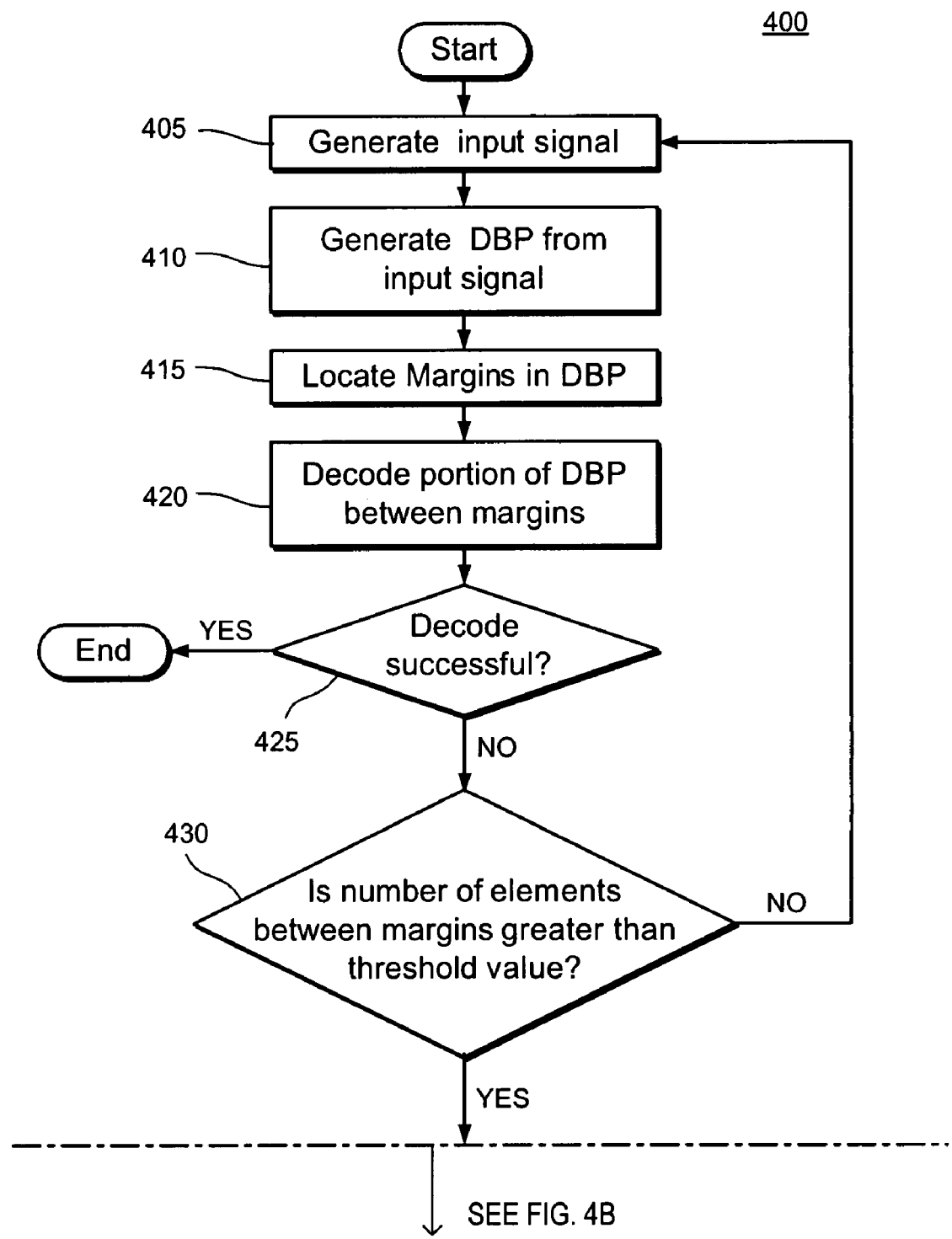
FIG. 4A shows an exemplary embodiment of a method for bar code detection according to the present invention.
Figure 4B:
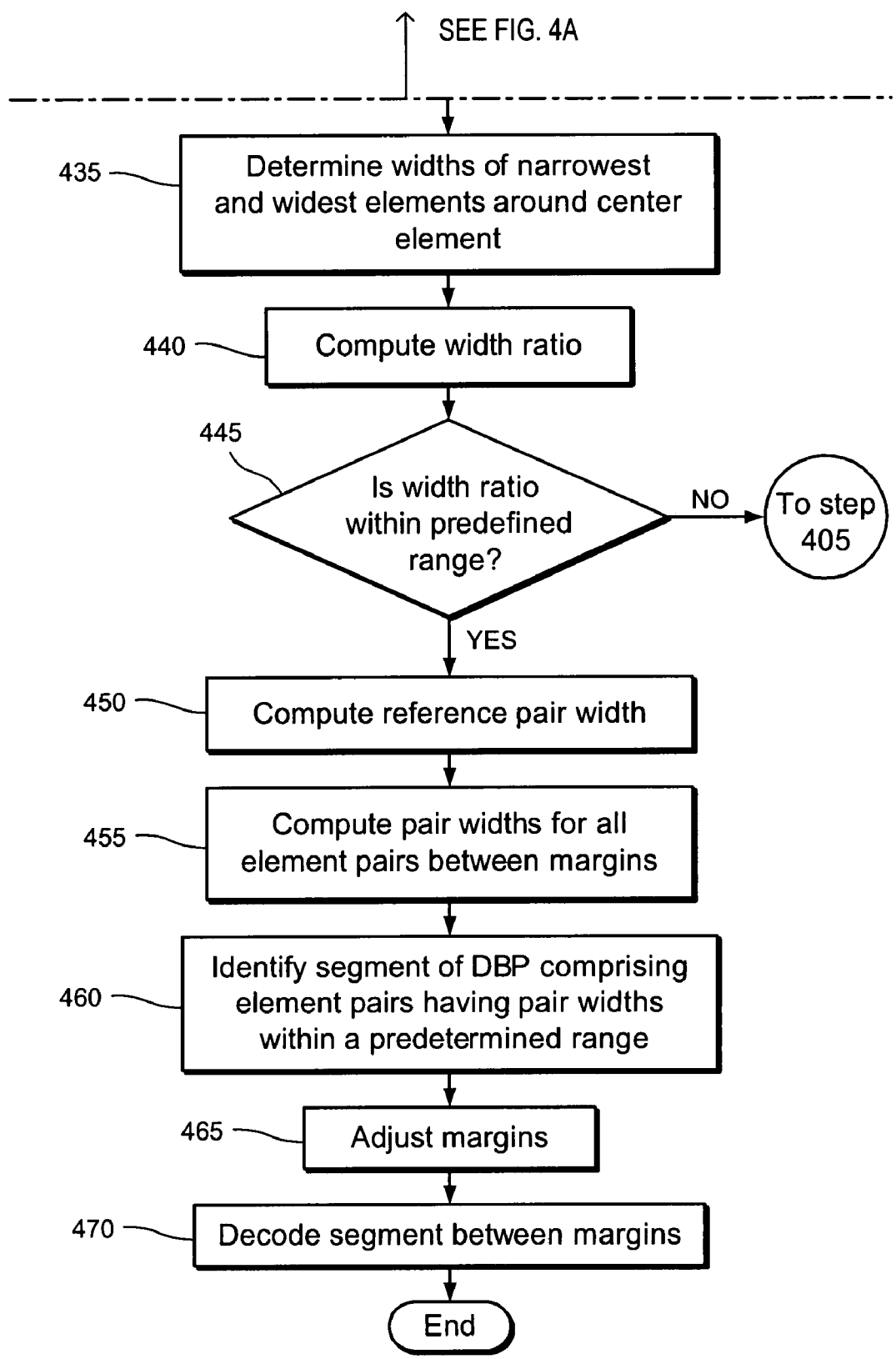
FIG. 4B shows further steps of the method of FIG. 4A.

FIGS. 4A and 4B show an exemplary embodiment of a method 400 for detecting and decoding a bar code according to the present invention. The method 400 will be described with reference to the system 5 of FIG. 1 and the DBP 200 of FIG. 2. In step 405, the scanner 10 generates an input signal based on the laser light reflected off the bar code 15. In the exemplary embodiments, the laser light moves linearly across a scan line at a substantially constant speed, and the bar code 15 is a MSI Plessey bar code. However, as stated above, the scanner 10 may be capable of two- and/or omni-dimensional scanning, and the bar code 15 may exhibit any of a variety of symbologies.

In step 410, the input signal is used by the digitizer to generate the DBP 200. As shown in FIG. 2, the DBP 200 includes the widths of all elements (transitions) detected by the digitizer. In step 415, a conventional center-out margin search is performed on the DBP 200. As shown in FIG. 2, the center-out margin search identifies a left margin 205 and a right margin 210 of the bar code 15 within the DBP 200.

In step 420, the decoder attempts to decode a portion of the DBP 200 between the left and right margins 205, 210. When the portion represents the complete bar code 15 (or a complete fragment thereof), the decoding is successful (step 425). However, the left and right margins 205, 210 may not correspond to actual left and right margins of the bar code 15. That is, the actual portion of the DBP 200 which represents a decodable signal are elements within a shaded region 220. The elements between the left margin 205 and the shaded region 220 (i.e., elements with widths 68, 54, 172, 207 and 131) and between the shaded region 220 and the right margin 210 (i.e., elements with widths 262 and 2394) may be false transitions which were detected by the digitizer. The false transitions may be a result of, for example, (i) noise in quiet space (i.e., white space surrounding actual margins of the bar code 15), (ii) text, graphics, etc. around a reduced space symbology (RSS) symbol and/or (iii) scans over surfaces of different reflectivity during omni-dimensional scanning. In any instance, the presence of the false transitions would render the portion of the DBP 200 between the left and right margins 205, 210 undecodable. Conventionally, subsequent DBPs would have to be generated and processed until a decodable signal was obtained, even though the DBP 200 may include the decodable signal as shown by the shaded region 220.

In step 430, it is determined whether a number of elements between the left and right margins 205, 210 is greater than a predetermined threshold value. In the exemplary embodiment, the predetermined threshold value corresponds to a minimum number of elements which represent a decodable bar code (or a fragment thereof). For example, if the bar code 15 is a MSI Plessey bar code, the predetermined threshold value would be approximately 20 elements when a shortest veiled bar code two characters long. When the number of elements between the left and right margins 205, 210 is less than the predetermined threshold value, the DBP 200 is discarded. When the number of elements is greater than the predetermined threshold value, properties of the elements between the left and right margins 205, 210 are analyzed to determine whether a decodable bar code (or fragment thereof) is contained between the margins 205, 210.

In other exemplary embodiments of the present invention, steps 420 and 425 may be bypassed, and the method 400 may proceed from step 415 directly to step 430. In this embodiment, the portion of the DBP 200 between the left and right margins 205, 210 is analyzed before it is decoded. In yet a further exemplary embodiment, the steps 415-425 may be bypassed, and the method 400 may proceed from step 410 to 430. In this embodiment, the entire DBP 200 is analyzed to determine a location of a decodable bar code (or fragment thereof).

In step 435, widths of the elements within a predetermined distance from a center element are analyzed to determine the widths of a narrowest element and a widest element. Within this step, the center element is determined by, for example, computing a total number of elements in the portion of the DBP 200 between the left and right margins 205, 210 (e.g., 41 elements) and dividing by two. As shown in FIG. 2, a center element 225 is the element (underlined) having a width of 69 data points. The widths of a predetermined number K of elements to the left and right of the center element 225 are then analyzed to determine the narrowest and widest elements. The number K may be determined as a function of the symbology of the bar code 15. For example, in the case of the MSI Plessey bar code, the number K may be equal to 6 (K=6). As shown in FIG. 2, the width of the narrowest element around the center element 225 is approximately 65 data points, and the width of the widest element around the center element 225 is approximately 146 data points. Alternatively, a histogram of the portion of the DBP 200 between the left and right margins 205, 210 may be used to determine the widths of the narrowest and widest elements, e.g., two dominant peaks in the histogram may represent the narrowest element and the widest element, whose widths are then determined. The widths of the narrowest and widest elements around the center element 225 may be used as approximations for lower and upper bounds, respectively, for the width of any element (bar or space) in the bar code.

In step 440, a width ratio is generated to ensure that the widths determined in step 435 are within reasonable limits, e.g., not attributable to noise. The width ratio may be computed by dividing the width of the widest element by the width of the narrowest element (146/65≈2.25). If the width ratio is not within a predetermined range (e.g., approximately 2 to 3), the DBP 200 may be discarded (step 445). When the width ratio is within the range, the portion of the DBP 200 between the margins 205,210 is further analyzed to determine the existence of a decodable signal.

In step 450, a reference pair width is computed. While the exemplary embodiments of the present invention will be described with reference to elements pairs, those of skill in the art will understand that element triads, quadruples, etc. may be utilized. In one exemplary embodiment, the reference pair width may be a sum of the widths of the widest and narrowest elements used to compute the width ratio. For example, the reference pair width may be 211 data points (146+65=211). In another exemplary embodiment, each element pair within the number K elements from the center element 225 is analyzed to determine lowest and highest pair widths, which are then averaged to generate the reference pair width. As understood by those of skill in the art, the elements in the MSI Plessey bar code are generally arranged in an alternating width arrangement, e.g., narrow bar and wide space, or wide bar and narrow space, such that each pair of elements includes a wide element and a narrow element. In a further exemplary embodiment, a running average of the pair widths for all pairs within the number K elements from the center element 225 may be used to generate the reference pair width, as will be described further below.

In step 455, a pair width is computed for each element pair between the left and right margins 205, 210. Beginning with the center element 225, a first pair width of the element pair immediately left (downward) would be 207 data points (65+141=207). This process is repeated for each element pair between the center element 225 and the left margin 205. For example, a last pair width of the element pair including the element identified as the left margin 205 would be 673 data points (68+605=673). The pair widths are also computed for the element pairs between the center element 225 and the right margin 210.

In step 460, a segment of the DBP 200 is identified which comprises a longest string of element pairs whose pair widths are within a predefined range. Upper and lower bounds of the range may be generated by multiplying the reference pair width by first and second reference values, respectively. As understood by those of skill in the art, the upper and lower bounds are used to filter out false transitions detected by the digitizer which may be attributable to, for example, noise and/or other artifacts in the DBP 200. In the exemplary embodiment, when the bar code 15 is the MSI Plessey bar code, the first reference value is approximately 1.125 and the second reference value is approximately 0.875. Thus, in the exemplary embodiments, the pair width of each element pair between the left and right margins 205, 210 is compared to the predefined range as follows:

for each element pair i from left margin to right margin $$(first\_RV*RPW) > PW(i) > (second\_RV*RPW)$$

where RV=reference value
RPW=reference pair width
PW(i)=pair width of element pair i.

From the center element 205 toward the left margin 205, the element pair "131 and 207" is the first element pair to have a pair width (131+207=338) outside of the predefined range (338>211*1.125). And, from the center element 205 toward the right margin 210, the element pair "262 and 2394" is the first element pair to have a pair width (262+ 2394=2656) outside of the predefined range (2656>211*1.125). Thus, the result of step 460 would be the segment of the DBP 200 which extends the width of the shaded region 220, i.e., from a leftmost element with width 147 to a rightmost element with width 141.

In step 465, the margins are adjusted to correspond to the margins of the segment determined in step 460, i.e., consecutive element pairs with pair widths within the predefined range. Thus, a new left margin 205' and a new right margin 210' are identified. The new left margin 205' corresponds to an element immediately to the left of the leftmost element of the segment (i.e., element with width 131), and the new right margin 210' corresponds to an element immediately to the right of the rightmost element of the segment (i.e., element with width 262). The segment between the new left and right margins 205', 210' is then input to the decoder, as indicated by step 470. As noted above, the segment may be decoded "as is" or input to a stitching algorithm for combination with other segment(s) prior to decoding.

According to the exemplary embodiments of the present invention, a scan direction of the DBP 200 (or only the segment) may also be determined prior to decoding. For example, some symbologies may have characteristics which indicate a beginning and an end, so that an analysis of the DBP would determine an orientation of the bar code 15 relative to the scanner 10, e.g., nominal (aka forward) orientation is when the bar code 15 is scanned by the scanner 10 with the laser moving left-to-right. Reversed orientation is when the laser scans the bar code 15 moving right-to-left, or when the bar code 15 is upside-down relative to the scanner 15 and the laser moved left-to-right. The MSI Plessey bar code, when scanned with the nominal orientation left-to-right, has a predefined format of element pairs comprising a wide element and a narrow element. However, when the bar code 15 is scanned with the reversed orientation right-to-left, then pairs of two consecutive narrow elements or pairs of two consecutive wide elements will be detected. If this pattern is identified for the first time, the center element 225 may be adjusted by moving it to a subsequent (or prior) element in the DBP 200, and the calculations of steps 450, 455 and 460 are repeated. Then the orientation information is passed to the decoder, which in the case of the MSI Plessey bar code, should decode right-to-left. Those of skill in the art will understand that the scan direction may be determined at any point in the method 400, e.g., during the center-out margin search, during the analysis of the elements between the left and right margins 205, 210, etc.

As shown in FIG. 2, the portion of the DBP 200 which corresponds to the signal produced by the bar code 15 is generally centered on the scan line. Thus, any noise exhibited in the DBP 200 is typically symmetrical about the center element 225. This may occur when the laser beam sweeps over the scan line at a constant speed. However, as known by those of skill in the art, the speed of the laser beam may sometimes be reflected by a bell-curve. That is, the speed may increase as the beam moves from a leftmost portion of the scan line towards the center, and then decrease as it moves toward a rightmost portion of the scan line. As a result, elements towards the edges of the scan line may exhibit a greater width (in data points) than similarly sized elements toward the center of the scan line. When the element widths follow a "trend" (e.g., element widths increase/decrease along the scan line), it may be difficult to determine the reference pair width, because the pair widths on a left side of the center element will either be higher or lower than the pair widths on the right side. Thus, the exemplary embodiments of the present invention also provide an effective method of analyzing a train of elements (or element groups) which exhibit a trend.

Figures 5, 6:
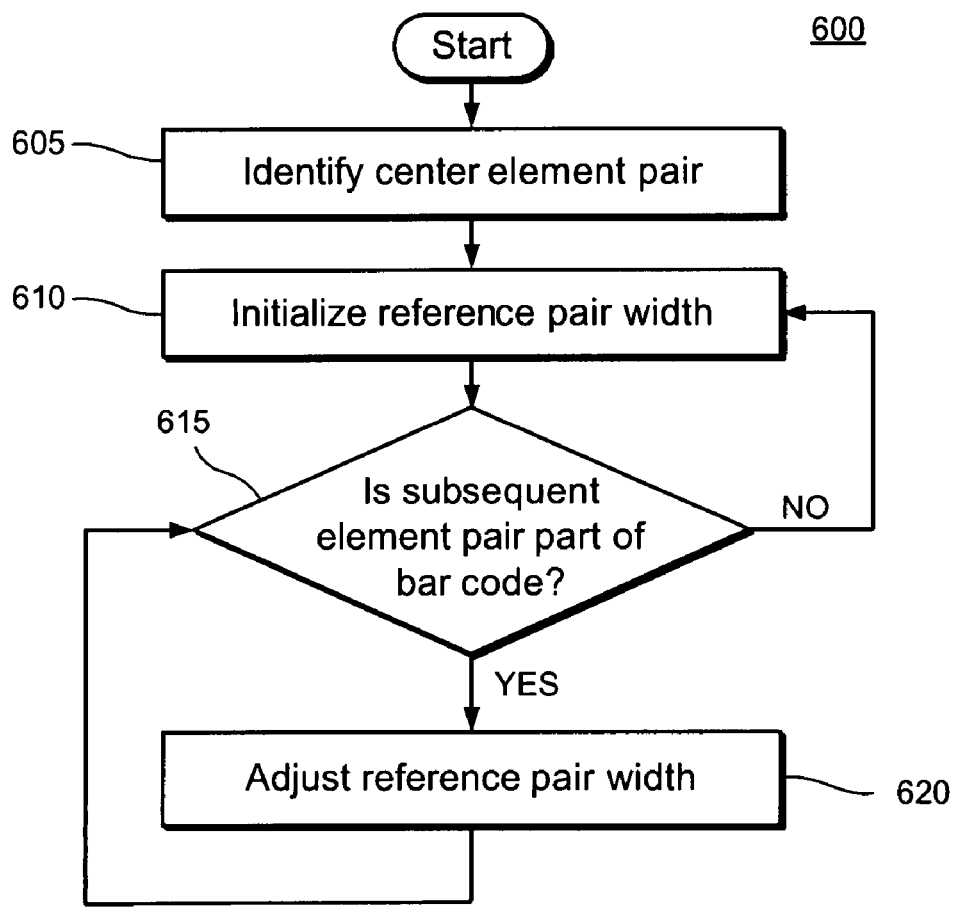
FIG. 5 shows an exemplary embodiment of a digitized bar pattern which exhibits a trend according to the present invention.
FIG. 6 shows an exemplary embodiment of a method for computing a running average of element pair widths according to the present invention.

FIG. 5 shows an exemplary embodiment of a DBP 500 which exhibits the trend. In the DBP 500, the pair widths increase from left to right along the scan line (from 223=71+ 152 to 489=307+182). A running average of the pair widths may be used to compute the reference pair width in the case of the trend. Those of skill in the art will understand that the running average may be used whether the pair widths increase or decrease from left to right.

FIG. 6 shows an exemplary embodiment of a method 600 for computing the running average of the reference pair width according to the present invention. In step 605, a center element pair 525 of the DBP 500 is identified. In step 610, a reference pair width is initialized to a pair width of the center element pair 525 (93+192=285). In step 615, the process proceeds to determine whether a subsequent element pair adjacent to the center element pair 525 belongs to the bar code. In the exemplary embodiment, a width ratio of the elements in an element pair immediately to the left is computed and compared to a predetermined range, as described above. In step 620, the pair width of the subsequent element pair is within the range (belongs to the bar code), and thus, the reference pair width is adjusted using a running average algorithm. In the exemplary embodiment, the pair width of the subsequent element pair and the reference pair width are averaged. The reference pair width is adjusted for each element pair to the left of the center element pair 525 as follows:

for all element pairs i from center element pair through valid subsequent element pairs $$new\_RPW = (\Sigma EPW_i)/i$$

where RPW=reference pair width
$EPW_i$=sum of widths of element pairs to element pair i The running average is computed until it is determined that a subsequent element pair does not belong to the bar code. At this point, the reference pair width is re-initialized to the pair width of the center element pair (285), and the process is executed for the element pairs to the right of the center element pair 525.

Although, the exemplary embodiments of the present invention have been described with reference to the MSI Plessey bar code, those of skill in the art will understand that the methods and processes described herein may be extended to other symbologies, e.g., binary and/or delta. When another symbology is used, the attributes analyzed may differ from the pair widths described above. For example, in the case of UPC/EAN, element quadruplets may be used instead of the element pairs representative of the MSI Plessey bar code. A UPC/EAN character is composed of two bars and two spaces in such a way that a sum of the widths of the four elements is approximately equal to seven times (7×) a width of the narrowest element. In the case of a Code 39 character, there are three wide elements between six narrow elements and a total character width is approximately equal to (3*R+6), where R is equivalent to the width ratio, as determined above.

Another symbology attribute which may be analyzed according to the present invention is a character clocking. Classes of widths of bar code elements may be another attribute. That is, either the element widths across the bar code remain steady or change according to a trend, as shown in FIG. 5. Thus, for a given symbology, the widths for the narrowest and widest elements, the width ratio, etc. may be determined. As long as the widths of successive elements belong to a determined class and the character clocking requirement is fulfilled, then the element (or sequence of elements) may be used to adjust the location of the margins the same way the element pairs are used in the case of the MSI Plessey bar code.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   generating a digitized bar pattern (DBP) including a series of elements corresponding to elements of a scanned bar code;
   identifying a first set of margins around a first portion of the series of elements;
   when an attempt to decode the first portion is unsuccessful, analyzing the first portion to determine a second set of margins around a second portion of the series of elements, the second set of margins being within the first set of margins, wherein the analyzing includes identifying a center element in the first portion and determining a narrow width of a narrowest element and a wide width of a widest element width within a predetermined number of elements of the center element;
   wherein the determining elements in the first portion includes computing a reference pair width as a function of the narrow width and the widest width and computing a pair width for each element pair between the first set of margins; and
   inputting the second portion to a decoding algorithm.

2. The method according to claim 1, further comprising:
   scanning the bar code using one of (i) one-dimensional scanning, (ii) two-dimensional scanning and (iii) omni-dimensional scanning.

3. The method according to claim 1, wherein the identifying includes:
   executing a center-out margin search on the series of elements.

4. The method according to claim 1, wherein the analyzing includes:
   comparing a number of elements in the first portion to a predetermined threshold value; and
   when the number of elements is greater than the predetermined threshold value, analyzing attributes of the elements in the first portion to determine the second set of margins.

5. The method according to claim 1, wherein the analyzing further includes:
   computing a width ratio as a function of the narrowest element width and the widest element width; and
   when the width ratio is within a predefined range, determining elements in the first portion which correspond to the second set of margins.

6. The method according to claim 5, wherein the predetermined range is selected as a function of a symbology of the scanned bar code.

7. The method according to claim 5, wherein the determining elements in the first portion further includes:
   determining a segment of consecutive element pairs between the first set of margins, each of the element pairs having a corresponding pair width within a predetermined range; and
   determining the second set of margins as a function of the segment.

8. The method according to claim 7, wherein the predetermined range is determined as a function of the reference pair width and reference values corresponding to upper and lower bounds of the predetermined range.

9. The method according to claim 7, wherein the computing the reference pair includes:
   when the first portion exhibits a trend, computing a running average of the pair widths for each element pair between the first set of margins.

10. The method according to claim 1, wherein the decoding algorithm is a stitching algorithm.

11. A system, comprising:
    a processor generating a digitized bar pattern (DBP) including a series of elements corresponding to elements of a bar code, the processor identifying a first set of margins around a first portion of the series of elements,
    wherein, when an attempt to decode the first portion by the processor is unsuccessful, the processor analyzes the first portion to determine a second set of margins around a second portion of the series of elements, the second set of margins being within the first set of margins, the analyzing including identifying a center element in the first portion and determining a narrow width of a narrowest element and a wide width of a widest element width within a predetermined number of elements of the center element;
    wherein the determining elements in the first portion includes computing a reference pair width as a function of the narrow width and the widest width, and computing a pair width for each element pair between the first set of margins; and
    wherein the processor inputs the second portion to a decoding algorithm.

12. The system according to claim 11, further comprising:
    a scanner scanning the bar code.

13. The system according to claim 12, wherein the scanner is configured for one of (i) one-dimensional scanning, (ii) two-dimensional scanning and (iii) omni-dimensional scanning.

14. The system according to claim 11, wherein the processor executes a center-out margin search on the series of elements to identify the first set of margins.

15. The system according to claim 11, wherein the processor compares a number of elements in the first portion to a predetermined threshold value, and when the number of elements is greater than the predetermined threshold value, the processor analyzes attributes of the elements in the first portion to determine the second set of margins.

16. The system according to claim 15, wherein the processor, computes a width ratio as a function of the narrowest element width and the widest element width and, when the width ratio is within a predefined range, determines elements in the first portion which correspond to the second set of margins.

17. The system according to claim 16, wherein the predetermined number is selected as a function of a symbology of the scanned bar code.

18. The system according to claim 16, wherein the processor determines a segment of consecutive element pairs between the first set of margins, each of the element pairs having a corresponding pair width within a predetermined range, and determines the second set of margins as a function of the segment.

19. The system according to claim 18, wherein the predetermined range is determined as a function of the reference pair width and reference values corresponding to upper and lower bounds of the predetermined range.

20. The system according to claim 18, wherein, when the first portion exhibits a trend, the processor computes a running average of the pair widths for each element pair between the first set of margins.

21. The system according to claim 11, wherein the decoding algorithm is a stitching algorithm.

22. A computer-readable storage medium strong a set of instructions, the set of instructions capable of being executed by a processor, the set of instructions comprising the steps of:

generating a digitized bar pattern (DBP) including a series of elements corresponding to elements of a scanned bar code;

identifying a first set of margins around a first portion of the series of elements;

when an attempt to decode the first portion is unsuccessful, analyzing the first portion to determine a second set of margins around a second potion of the series of elements, the second set of margins being within the first set of margins, wherein the analyzing includes identifying a center element in the first portion and determining a narrow width of a narrowest element and a wide width of a widest element width within a predetermined number of elements of the center element;

wherein the determining elements in the first portion includes computing a reference pair width as a function of the narrow width and the widest width, and computing a pair width for each element pair between the first set of margins; and inputting the second portion to a decoding algorithm.

23. A system, comprising:

a processing means for generating a digitized bar pattern (DBP) including a series of elements corresponding to elements of a bar code, the processing means identifying a first set of margins around a first portion of the series of elements, wherein, when an attempt to decode the first potion by the processing means is unsuccessful, the processing means analyzes the first portion to determine a second set of margins around a second portion of the series of elements, the second set of margins being within the first set of margins, the analyzing including identifying a center element in the first portion and determining a narrow width of a narrowest element and a wide width of a widest element width within a predetermined number of elements of the center element;

wherein the determining elements in the first portion includes computing a reference pair width as a function of the narrow width and the widest width, and computing a pair width for each element pair between the first set of margins; and wherein the processing means inputs the second portion to a decoding algorithm.

24. The system according to claim 23, further comprising:

a scanning means for scanning the bar code.

* * * * *

UNITED STATES PATENT AND TRADEMARK OFFICE
CERTIFICATE OF CORRECTION

PATENT NO.         : 7,364,080 B2                                    Page 1 of 1
APPLICATION NO.    : 11/387545
DATED              : April 29, 2008
INVENTOR(S)        : Madej et al.

It is certified that error appears in the above-identified patent and that said Letters Patent is hereby corrected as shown below:

IN THE SPECIFICATION

1. In Column 6, Line 64, after "i" insert -- . --.

IN THE CLAIMS

2. In Column 7, Line 60, in Claim 1, after "width" insert -- , --.

3. In Column 9, Line 39, in Claim 22, delete "strong" and insert -- storing --, therefor.

4. In Column 10, Line 5, in Claim 22, delete "potion" and insert -- portion --, therefor.

5. In Column 10, Line 25, in Claim 23, delete "potion" and insert -- portion --, therefor.

Signed and Sealed this

Twenty-fourth Day of November, 2009

David J. Kappos
*Director of the United States Patent and Trademark Office*